(12) United States Patent
Möller et al.

(10) Patent No.: US 7,326,393 B2
(45) Date of Patent: Feb. 5, 2008

(54) PROCESS FOR THE CONVERSION OF POLYSULFANES

(75) Inventors: Alexander Möller, Gelnhausen (DE); Wolfgang Böck, Langenselbold (DE); Wolfgang Taugner, Altenstadt (DE); Harald Heinzel, Altenstadt (DE); Stephan Rautenberg, Bornheim (DE)

(73) Assignee: Degussa AG, Düsseldorf (DE)

( * ) Notice: Subject to any disclaimer, the term of this patent is extended or adjusted under 35 U.S.C. 154(b) by 145 days.

(21) Appl. No.: 10/529,148

(22) PCT Filed: Aug. 26, 2003

(86) PCT No.: PCT/EP03/09432

§ 371 (c)(1),
(2), (4) Date: Mar. 24, 2005

(87) PCT Pub. No.: WO2004/028963

PCT Pub. Date: Apr. 8, 2004

(65) Prior Publication Data

US 2005/0265913 A1    Dec. 1, 2005

(30) Foreign Application Priority Data

Sep. 26, 2002   (DE) ................ 102 45 164

(51) Int. Cl.
    *C01B 12/20*   (2006.01)
(52) U.S. Cl. .................................. 423/242.2
(58) Field of Classification Search ............. 423/242.2
    See application file for complete search history.

(56) References Cited

U.S. PATENT DOCUMENTS

| 2,479,781 | A |   | 8/1949 | Robinson et al. ............. 23/181 |
| 2,784,055 | A |   | 3/1957 | Silver et al. ................. 23/181 |
| 4,444,259 | A | * | 4/1984 | Schwall ...................... 166/265 |
| 5,622,682 | A | * | 4/1997 | Tom ........................... 423/230 |
| 5,866,721 | A | * | 2/1999 | Hofen et al. .................. 568/71 |

FOREIGN PATENT DOCUMENTS

| DE | 1768826  |   | 8/1971 |
| FR | 2844208  | * | 3/2004 |
| GB | 1 268 842 | * | 3/1972 |
| GB | 1268842  |   | 3/1972 |

* cited by examiner

Primary Examiner—Yvonne (Bonnie) Eyler
Assistant Examiner—Chukwuma Nwaonicha
(74) Attorney, Agent, or Firm—Michael A. Sanzo; Law Office of Michael A. Sanzo, LLC

(57) ABSTRACT

The invention provides a process for the removal of polysulfanes from gas streams formed during $H_2S$ synthesis.

17 Claims, No Drawings

PROCESS FOR THE CONVERSION OF POLYSULFANES

CROSS REFERENCE TO RELATED APPLICATIONS

The present application represents U.S. national stage of international application PCT/EP2003/009432, which had an international filing date of Aug. 26, 2003, and which was published in English under PCT Article 21(2) on Apr. 8, 2004. The international application claims priority to German application 102 45 164.8, filed on Sep. 26, 2002.

FIELD OF THE INVENTION

The invention relates to a process for the removal of polysulfanes from gas streams formed during $H_2S$ synthesis.

BACKGROUND

In $H_2S$ syntheses from hydrogen and sulfur, polysulfanes ($H_2S_n$) are generally found as by-products in the crude gas in an order of magnitude of $\geq 400$ vpm (volume per million), and when the gas stream is compressed these tend to decompose in an uncontrolled manner into $H_2S$ and sulfur. This leads to undesirable sulfur deposits in the whole of the compression area, including the peripheral pipes and valves.

It is known that polysulfanes are thermodynamically unstable and have a tendency to decompose, particularly when heated (M. Schmidt, W. Siebert: "Sulfane" in Comprehensive Inorganic Chemistry, vol. 2, sect. 2.1, Pergamon Press, Oxford 1973, 826–842).

Traces of alkali on the surface of glass vessels lead to the deposition of elemental sulfur.

However, these findings come from investigations with polysulfanes present in more or less pure form.

In principle, of course, they also apply to polysulfanes present in great dilution.

In this case, however, the influence of the concentration ratios has to be taken into account.

Under the above circumstances, the polysulfanes are present in great dilution in hydrogen sulfide, which at the same time represents a decomposition product of the polysulfanes in a thermodynamic equilibrium:

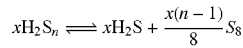

$$xH_2S_n \rightleftharpoons xH_2S + \frac{x(n-1)}{8}S_8$$

The high $H_2S$ concentration makes the shift of the equilibrium to the left-hand side seem probable and the decomposition of the polysulfanes into hydrogen sulfide and sulfur to be a non-preferred reaction.

The object of the invention is to provide a process for the practically complete removal of the polysulfanes, thus preventing sulfur deposits in the plant's pipes.

SUMMARY OF THE INVENTION

The invention provides a process for the removal of polysulfanes from crude gas formed during the production of hydrogen sulfide, characterized in that the crude gas, with a content of >80 vol., preferably >95 vol. $H_2S$ and >100 to 2000 vpm, particularly >400 to 1500 vpm, of polysulfanes ($H_2S_n$ with n: 2 to 8), is passed through an optionally multi-stage washer system, brought into contact with water and/or methanol, preferably with basic aqueous and/or methanol systems, and a pure gas is obtained in which the polysulfanes are present depleted by >50 to >99.5%, based on the starting value.

The quantities of polysulfanes can optionally also be more than 2000 vpm.

DETAILED DESCRIPTION OF THE INVENTION

Jet washers are preferably used, which, like other washers, can be operated at a pressure of 1.05 to 10 bara, preferably at 1.05 to 2 bara.

Unpressurized operation is an alternative, however. In particular, aqueous and/or methanolic 0.5 to 20 wt. %, preferably 0.5 to 10 wt. %, solutions of alkali hydroxides or oxides, especially KOH/KHS or NaOH/NaHS solutions, are used as washing fluid.

The hydrogen sulfides are formed while passing the gas streams through the washing fluid.

Appropriately concentrated solutions of other basic oxides or hydroxides, especially of alkaline earth hydroxides or oxides, preferably those of calcium, can also be used.

The polysulfanes are also removed from the gas streams by basic aqueous and/or methanolic 1–20%, preferably 1 to 10 wt. %, solutions of ammonia, organic amines, of the general formula $(C_nH_{2n+1})_xNH_y$ with n=1, 2, 3; x=2, 3; y=0, 1 or amino alcohols of the general formula $(C_nH_{2n+1}O)_xNH_y$ with n=1, 2, 3; x=2, 3; y=0, 1.

The suitable temperature range is generally between 0 and 150° C., especially 10 and 60° C.

At gas velocities of the crude gas to be purified of generally between 0.1 and 25 m/s, especially 10 and 22 m/s, the polysulfanes are removed from the gas streams with a degree of depletion of >50 to >99.5%, preferably >70 to >99.5%, based on the starting content in the crude gas.

For a content of >500 vpm in the crude gas, this corresponds to a depletion to <10 vpm in the pure gas.

The sulfur formed during the conversion of the polysulfanes goes into solution, among other things as a result of the formation of the corresponding polysulfides. Sulfur precipitated in solid form can optionally be discharged with the aid of suitable filtration devices. The washing solution circulates and is discharged as a function of the polysulfide/sulfur load. The washing fluid is topped up as a function of the rate of discharge and of quantities of solvent that may evaporate. To remove any residual quantities of polysulfanes present after the jet washer (generally $\leq 20\%$ of the starting quantity), the $H_2S$-containing gas is generally after-treated with the above-mentioned solutions in a washing column or a packed bed in counter-current (counter-current washer). Entrained droplets are separated by means of a demister system. Any quantities of sulfane remaining in the gas stream of purified $H_2S$ can also be broken down in a downstream adsorber bed (activated carbon, zeolite) and the sulfur formed can be separated off.

Analytical

The analytical acquisition of the sulfane concentration in the crude and pure gas takes place by means of an online UV measurement. Parallel to this, sulfur contents in the washing solution and sulfane and sulfur concentration in the $H_2S$-containing gas stream are determined by wet-chemical means as required.

With the aid of the process according to the invention, it is possible to deplete the polysulfanes to such an extent that, in downstream processes, e.g. compressor stages, undesirable sulfur deposits are avoided.

EXAMPLES

Crude gases with a polysulfane content of >400 to 2000 vpm are used.

The polysulfane concentrations are dependent upon the reaction conditions in the $H_2S$ reactor.

Comparative Example 1

$H_2S$ crude gas was passed through an adsorption column packed with approx. 7 l of etched Raschig rings at 20 $Nm^3$/h. The sulfur forming by decomposition of the polysulfanes was deposited on the surface of the packings.

A degree of depletion of 25% was achieved. Service life of the adsorber bed 20 h.

Comparative Example 2

$H_2S$ crude gas was passed through an adsorption column packed with approx. 7 l of $SiO_2$ supports (particle size 3–5 mm) at 20 $Nm^3$/h. The sulfur forming by decomposition of the polysulfanes was deposited on the surface of the packings. A degree of depletion of 50% was achieved. Service life of the adsorber bed 48 h.

Example 1

$H_2S$ crude gas was passed first through a jet washer system operated only with water and then through an adsorption column packed with approx. 12 l of activated carbon (particle size 5–6 mm) at 200 $Nm^3$/h for 60 h. Before entering the adsorption column, a degree of depletion of 75% and after the column a value of >99% was measured.

Example 2

$H_2S$ crude gas was passed through a jet washer system supplied with methanol at 200 $Nm^3$/h for 48 h. A degree of depletion of >50% was achieved, based on the crude gas.

Example 3

$H_2S$ crude gas was passed through a washing column operated with a methanol/triethanolamine mixture (5% triethanolamine) for 24 h at 10 $Nm^3$/h. The sulfur forming as a result of decomposition of polysulfanes dissolved in the washing solution. A degree of depletion of 80% was achieved.

Example 4

$H_2S$ crude gas was passed through a jet washer system supplied with a methanol/NaOH mixture (5% NaOH) for 400 h at 200 $Nm^3$/h. A degree of depletion of 99% was achieved.

The sulfur deposited after a running time of approx. 200 h was removed from the washer circulation with the aid of in-line filtration.

Example 5

$H_2S$ crude gas was passed through a jet washer system supplied with a water/KOH mixture (12% KOH) for 200 h at 200 $Nm^3$/h. A degree of depletion of 99.5% was achieved.

What is claimed is:

1. A process for obtaining a purified gas by removing polysulfanes from crude gas formed during the production of hydrogen sulfide, wherein said crude gas comprises greater than 80% by volume of $H_2S$ and 100-2000 vpm of polysulfanes of the formula $H_2S_n$, wherein n=2-8, said process comprising:
   a) passing said crude gas through a wash system where said crude gas is brought into contact with a wash solution comprising water or methanol; and
   b) collecting said purified gas from the wash solution of step a).

2. The process of claim 1, wherein said polysulfanes are present in said crude gas at 400–1500 vpm.

3. The process of claim 1, wherein said wash system is a jet washer.

4. The process of claim 1, further comprising a second wash step in which the purified gas produced in step a) is passed through a counter-current washer comprising an aqueous or methanolic solution.

5. The process of claim 1, further comprising a second wash step in which the purified gas produced in step a) is passed through an adsorber bed.

6. The process of claim 1, wherein relative to said crude gas, the polysulfanes in said purified gas have been reduced by 50–99.5%.

7. The process of claim 1, wherein said process is carried out at a temperature of 0–150° C.

8. A process for obtaining a purified gas by removing polysulfanes from crude gas formed during the production of hydrogen sulfide, wherein said crude gas comprises greater than 80% by volume of $H_2S$ and 100-2000 vpm of polysulfanes of the formula $H_2S_n$, wherein n=2-8, and wherein said process comprises:
   a) passing said crude gas through a wash system comprising an aqueous or methanolic solution containing 0.5–20 wt % of an alkali or alkaline earth hydroxide or oxide; and
   b) collecting said purified gas from the aqueous or methanolic solution of step a).

9. The process of claim 8, wherein said polysulfanes are present in said crude gas at 400–1500 vpm.

10. The process of claim 8, wherein relative to said crude gas, the polysulfanes in said purified gas have been reduced by 50–99.5%.

11. The process of claim 8, wherein said wash system is a jet washer and said process further comprises a second wash step in which the purified gas of step a) is passed through either: a counter-current washer comprising an aqueous or methanolic solution; or an adsorber bed.

12. A process for obtaining a purified gas by removing polysulfanes from crude gas formed during the production of hydrogen sulfide, wherein said crude gas comprises greater than 80% by volume of $H_2S$ and 100-2000 vpm of polysulfanes of the formula $H_2S_n$, wherein n=2-8, and wherein said process comprises
   a) passing said crude gas through a wash system comprising an aqueous or methanolic solution containing 1–20 wt % of a compound selected from the group consisting of:
      i) an organic amine of the formula $(C_nH_{2n+1})_xNH_y$, where n=1–3, x=2 or 3, and y=0 or 1;
      ii) an amino alcohol of formula $(C_nH_{2n+1}O)_xNH_y$, where n=1–3, x=2 or 3, and y=0 or 1; and
      iii) ammonia;

b) collecting said purified gas from the aqueous or methanolic solution of step a).

13. The process of claim 12, wherein said compound is an organic amine of the formula $(C_nH_{2n+1})_xNH_y$, where n=1–3, x=2 or 3, and y=0 or 1.

14. The process of claim 12, wherein said compound is an amino alcohol of formula $(C_nH_{22n+1}O)_xNH_y$, where n=1–3, x=2 or 3, and y=0 or 1.

15. The process of claim 12, wherein said compound is ammonia.

16. The process of claim 12, wherein relative to said crude gas, the polysulfanes in said purified gas have been reduced by 50–99.5%.

17. The process of claim 12, wherein said wash system is a jet washer and said process further comprises a second wash step in which the purified gas of step a) is passed through either: a counter-current washer comprising an aqueous or methanolic solution; or an adsorber bed.

* * * * *